United States Patent
Ohba

(10) Patent No.: US 6,427,201 B1
(45) Date of Patent: Jul. 30, 2002

(54) INFORMATION PROCESSING APPARATUS FOR ENTERTAINMENT SYSTEM UTILIZING DMA-CONTROLLED HIGH-SPEED TRANSFER AND PROCESSING OF ROUTINE DATA

(75) Inventor: Akio Ohba, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/135,724

(22) Filed: Aug. 18, 1998

(30) Foreign Application Priority Data

Aug. 22, 1997 (JP) .............................................. 9-226892

(51) Int. Cl.[7] .............................................. G06F 15/00
(52) U.S. Cl. .............................. 712/22; 712/23; 712/34; 712/222; 709/222
(58) Field of Search ........................... 712/201, 22, 23, 712/34, 36, 16, 222, 225; 709/222, 212; 710/260, 7, 20, 21, 22, 23, 28; 711/135, 144, 137

(56) References Cited

U.S. PATENT DOCUMENTS

| | | | | |
|---|---|---|---|---|
| 5,187,795 A | * | 2/1993 | Balmforth et al. | ........ 708/229.2 |
| 5,701,482 A | * | 12/1997 | Harrison et al. | ............ 709/105 |
| 5,724,609 A | * | 3/1998 | Hatae et al. | ................... 710/22 |
| 5,752,071 A | * | 5/1998 | Tubbs et al. | .................. 712/34 |
| 5,819,102 A | * | 10/1998 | Reed et al. | .................... 712/34 |
| 5,961,628 A | * | 10/1999 | Nguyen et al. | ................ 712/2 |

* cited by examiner

*Primary Examiner*—Mark Zimmerman
*Assistant Examiner*—Mackly Monestime
(74) *Attorney, Agent, or Firm*—Lerner, David, Littenberg, Krumholz & Mentlik, LLP

(57) ABSTRACT

Routine processing for routine data, non-routine processing for routine data and general non-routine processing are to be processed efficiently. To this end, a main CPU 20 has a CPU core 21, having a parallel computational mechanism, a command cache 22 and a data cache 23, as ordinary cache units, and a scratch-pad memory SPR 24 which is an internal high-speed memory capable of performing direct memory accessing (DMA) suited for routine processing. A floating decimal point vector processor (VPE) 30 has an internal high-speed memory (VU-MEM) capable of DMA processing and is tightly connected to the main CPU to form a co-processor. The VPE 40 has a high-speed internal memory 40 (VU-MEM) capable of DMA processing. The DMA controller (DMAC) 14 controls DMA transfer between the main memory 50 and the SPR 24, between the main memory 50 and the (VU-MEM) 34 and between the (VU-MEM) 44 and the SPR 24.

6 Claims, 8 Drawing Sheets

INFORMATION PROCESSING APPARATUS FOR ENTERTAINMENT SYSTEM UTILIZING DMA-CONTROLLED HIGH-SPEED TRANSFER AND PROCESSING OF ROUTINE DATA

BACKGROUND OF THE INVENTION

1. Field of the Invention

This invention relates to an information processing device for efficiently performing routine and non-routine processing for routine data and general non-routine processing, and an entertainment system, such as a home game machine, employing the information processing device.

2. Description of Related Art

In a computer system, such as a workstation or a personal computer, or an entertainment system, such as a video game machine, attempts have been made for increasing the CPU speed and for enhancement of a cache memory system, adoption of parallel computing functions and introduction of a dedicated calculating system, for coping with the increased processing volume and the increased data volume.

In particular, enhancement of the cache memory system and parallel calculations (so-called multi-media commands) have been prevalent in the personal computer.

Although enhancement to the cache memory is statistically meritorious for so-called general-purpose processing, such as non-routine processing, the conventional cache structure cannot be said to be efficient for routine processing represented by e.g., MPEG decoding executed by a parallel calculation command, that is DSP type processing for large-capacity data.

That is, with the DSP processing of large-capacity data, flowing data is hardly accessed again. Therefore, a memory structure which is increased in speed on second accessing, such as a cache memory, cannot be said to be effective. The data accessed many times with the above DSP processing is temporary data of the internal parameters and the inner work area. The cache structure in which data used only once is necessarily written in the main memory cannot be said to be efficient.

Since the data format is fixed in this routine processing, a suitable data volume that is read into the cache can be set. However, since the data volume read at a time cannot be controlled by a program in the usual cache structure, data transfer cannot be increased in efficiency.

Also, if a dedicated calculating device for routine processing is used, there are occasions wherein data transfer to the dedicated calculating device represents a bottleneck in processing, although the device is high in processing speed and in efficiency for routine processing. Even if the processing bottleneck in data transfer is eliminated by employing a direct memory address (DMA) or providing a dedicated bus, the device is difficult to control from the main program and only poor in flexibility.

SUMMARY OF THE INVENTION

It is therefore an object of the present invention to provide an information processing device and an entertainment system for efficiently performing various processing operations, such as routine and non-routine processing for routine data and general non-routine processing.

In one aspect, the present invention provides an information processing apparatus including a main processor unit at least including parallel computational processing means, cache storage means, and direct-memory-accessible internal high-speed storage means, main storage means and a direct memory accessing controlling unit for direct memory access transfer control between the internal high-speed storage means in the main processor unit and the main storage means. The main processor unit, main storage means and the direct memory accessing unit are interconnected over a main bus.

Preferably, a floating decimal point vector processing unit at least including vector processing means and a direct-memory-accessible internal high-speed storage means is provided on the main bus.

In another aspect, the present invention provides an information processing apparatus including a main processor unit at least including computational processing means and cache storage means, main storage means, a floating decimal point vector processing unit at least including vector processing means and direct-memory-accessible internal high-speed storage means, and a direct memory accessing control unit for direct-memory-access transfer control between the internal high-speed storage means in the vector processor unit and the main storage means. The main processor unit, main storage means and the direct memory accessing control unit are interconnected over a main bus.

Preferably, the floating decimal point vector processing unit is made up of a first vector processor and a second processor and the first vector processor is tightly connected to the main processor unit to form a co-processor.

In an entertainment system according to yet another aspect of the present invention, the above-described information processing apparatus is a main processor system, to which is connected, via a sub-bus interface, a sub-processor system comprised of the sub-processor, sub-storage means and a sub-DMAC over a sub-bus. To this sub-bus are connected reproducing means for an external storage means, such as a CD-ROM drive, and actuating means such as a manual controller.

According to the present invention, since direct-memory-accessing transfer control is performed by a DMA controller between main storage means and the internal high-speed storage means of the main processing unit having, besides the parallel computational processing means, parallel computational processing means and the cache storage means, routine processing, in particular the processing of integer routine data, can be performed efficiently.

By additionally providing a floating decimal point vector processing unit having at least one direct memory-accessible high-speed internal storage means and vector computational processing means, routine processing of routine data can be performed efficiently. By providing two such floating decimal point vector processing unit and by tightly connecting one of the vector processors to the main processing unit for use as a co-processor, non-routine processing of routine data can be performed efficiently, while routine processing of routine data can be performed efficiently by the remaining vector processor.

By having, in addition to the main processing unit having usual cache storage means effective for non-routine processing, a vector processor having a high-speed internal memory and a data transfer mechanism by DMA suited to routine processing of routine data, and a tightly connected vector co-processor having a high-speed internal memory and a data transfer mechanism by DMA suited to non-routine processing of routine data, high-efficiency processing can be realized for a variety of processing configurations.

Moreover, by providing, in addition to the main processing unit having direct memory accessible internal high-speed memory means suited for routine processing and usual cache storage means effective for non-routine processing, a vector processor having a high-speed internal memory and a data transfer mechanism by DMA suited to routine processing of routine data and a high-speed internal memory and a direct memory accessing mechanism for direct memory accessing between the high-speed internal storage means in the vector processor and the high-speed internal memory in the vector processor, non-routine processing and routine and non-routine processing for routine data can be performed efficiently.

DESCRIPTION OF THE PREFERRED EMBODIMENTS

Figure 1:
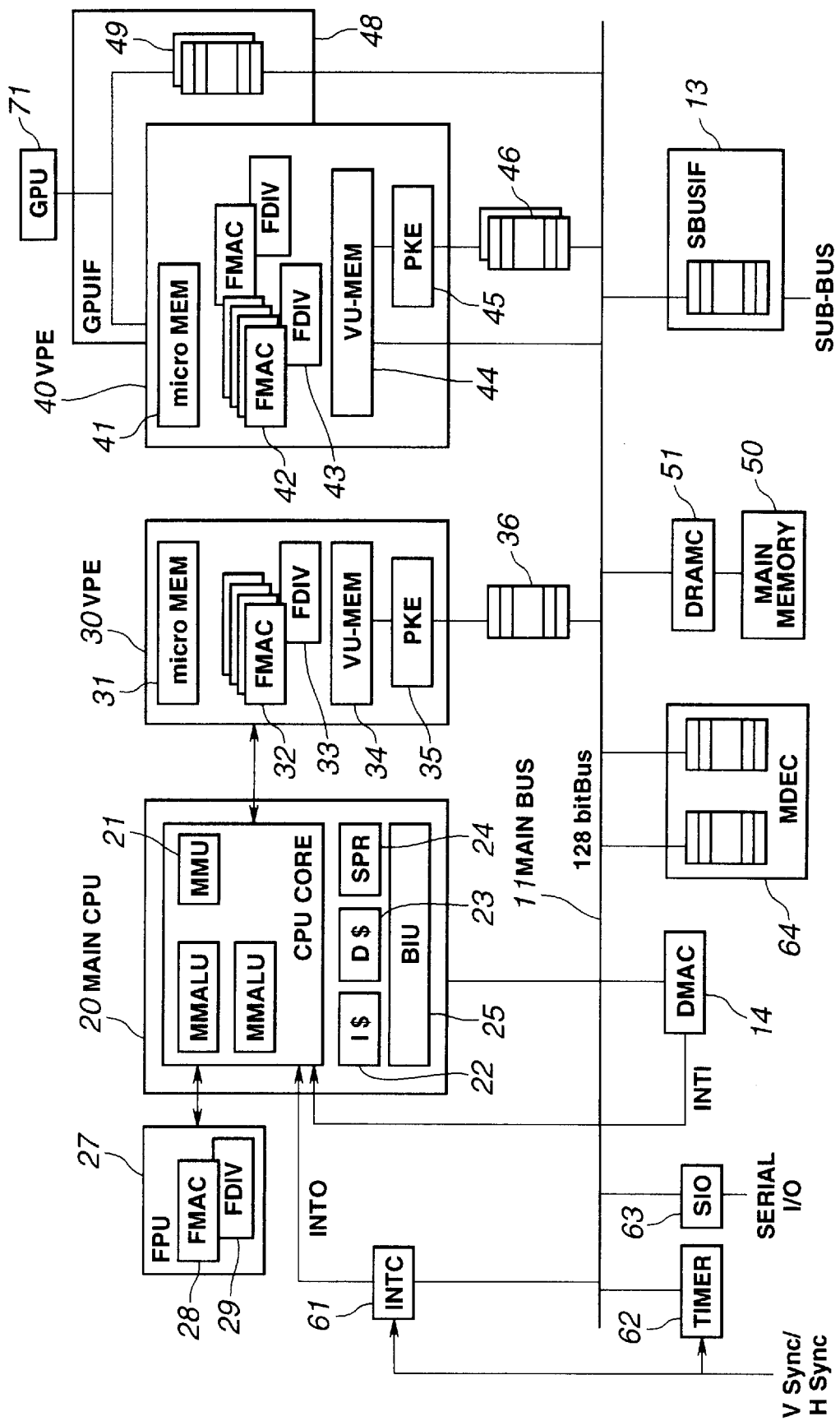
FIG. 1 is a block diagram showing a schematic structure of an embodiment of the present invention.

Referring to the drawings, preferred embodiments of the present invention will be explained in detail.

FIG. 1 is a block diagram showing a system structure to which is applied the data transfer method embodying the present invention.

In FIG. 1, there are connected on a main bus 11 a main CPU 20, operating as a main processor, two floating decimal point vector processors (VPE) 30, 40, a main memory 50 and a direct memory accessing circuit (DMAC) 14. A floating decimal point vector processor (FPU) 27 as a first co-processor is provided in association with the main CPU 20. The above-mentioned floating decimal point vector processor (FPU) 30 is tightly connected as a second co-processor to the main CPU 20. To the main bus 11 are also connected an interrupt controller (INTC), a timer 62, a serial interface (SIO) 63 and an MPEG decoder (MDEC) 64 operating as a decoder for the so-called MPEG 2. To the main bus 11 are further connected a sub-bus interface (SBUSIF) 13 for having data exchange with the sub-bus as later explained and a GPUIF 148 operating as an interface for the graphic processor as later explained.

The main CPU 20 has a CPU core 21 including a single instruction stream multiple data stream (SIMD) as a parallel calculation system and a usual cache mechanism effective for usual non-routine processing (general-purpose processing), that is an instruction cache (I$) 22 and a data cache (D$) 23. In addition, the main CPU 20 includes direct-memory-accessible internal high-speed memory (scratchpad memory SPR) 24 suited for routine processing and which is connected via bus interfacing unit (BIU) 25 to the main bus 11.

To this main CPU 20 are tightly connected a high-speed floating decimal point vector processor (FPU) 27 having a floating decimal point multiplier/adder (FMAC) 28 and a floating decimal point divider (FDIV) 29, as a first co-processor, and a floating decimal point vector processor (VPE) 30, as a second co-processor.

This floating decimal point vector processor (VPE) 30 has a micro-memory (Micro-MEM) 31, a floating decimal point multiplier/adder (FMAC) 32, floating decimal point divider (FDIV) 33, an enclosed memory (VU_MEM) 34 and a packet engine (PKE), and is connected via a first-in first-out (FIFO) memory 46 to the main bus 11.

The second floating decimal point vector processor (VPE) 40 similarly includes a micro-memory (Micro-MEM) 41, a floating decimal point multiplier/adder (FMAC) 42, a floating decimal point divider (FDIV) 43, an enclosed internal memory (VU-MEM) 44 and a packet engine (PKE), and is connected to the main bus 11 via a first-in first-out (FIFO) memory 46.

These floating decimal point vector processors (VPEs) 30, 40 execute matrix processing, coordinate transformation and perspective transformation at an elevated speed. The floating decimal point multiplier/adders (FMACs) and floating decimal point dividers (FDIVs) operating as floating decimal point vector processor units VU of the VPEs operate in accordance with the micro-program stored in the micro-memory (Micro-MEM) to calculate data in the internal register and the enclosed memory (VU-MEM) at an elevated speed. The packet engine (PKE) expands the packet of packed data or the micro-code of the VU transferred by direct memory access (DMA) as later explained in the memory (such as micro-MEM or VU-MEM) in accordance with the code in the packet (PKE code). The vector processor unit (VU) can be started via PKE by the DMA packet (inclusive of commands and data) and can constitute a VPE calculation processing program sequence independently of the CPU. Meanwhile, the first PE 30 is tightly connected as a co-processor of the main CPU 20 to the main CPU 20 as described above, the second VPE 40 has the function of sending the processing results to a graphical processor unit 71 via GPUIF 48 and thus operates as a pre-processor for the GPU 71.

The packet engines (PKEs) in the VPEs 30 and 40 are explained. The PKE sets an internal register for the DMA data pack sent to the FIFO memory by the direct memory access (DMA) in accordance with the PKE code or expands (unpacks) succeeding data to expand or synthesize data of the number indicated in the PK code at an address specified by the immediate value in the PKE code. Also, the PKE has the function of transferring the micro-code of the VPE to the micro-memory microMEM to transfer the drawing command of GPU or picture data directly to the GPUIF 148 without interposition of the enclosed memory 9 (VU-MEM).

The interrupt control circuit (INTC) 61 arbitrates interrupt requests from plural processors to send INTOinterrupt to the main CPU 20.

The DMA controller 14 (DMAC) intelligently distributes data as it arbitrates the main bus for plural processors which co-own and use the main memory resources. This transfer occurs between the peripheral processors, main memory and the scratch pad memory (SPM). Simultaneously, the bus inclusive of the main CPU is arbitrated.

That is, the scratch pad memory (SPR) 24 in the main CPU 20 is a high-speed internal memory that is suited to routine processing and to DMA As the DMA mechanism sited for routine processing of routine data, a data transfer mechanism between it and the enclosed memory (VU-MEM) 44 in the VPEs 40 is used.

The GPUIF 48 is an interface for communication between the CPU system connected to the main bus 11 of FIG. 1 and the graphic processor unit (GPU). To the GPU are sent in parallel two sets of data, that is a display list for routine processing via the VU (vector processor unit: FMAC 42 and the FDIV 43) of VPE 40 and a display list for exception processing generated by the main CPU 20 and the co-processor and which is directly sent to the GPU via FIFO memory 49. These two streams are arbitrated by the GPUIF 48 and time-divisionally sent to the GPU 71.

An MDEC 64 owns a picture-data expanding function having the so-called MPEG2 macro-block decoding function, an RGB converting function, a vector quantization function and a bitstream expanding function. The MPEG is an abbreviation of a Moving Picture Experts group for moving picture compression and encoding of the International Organization/International Electrotechnical Commission, Joint Technical Committee 1/Sub Committee 29 (ISO/IEC JTC1/SC29. The MPEG 1 and MPEG 2 standards are ISO11172 and ISO 13818, respectively.

The main memory 50 is constituted by, for example, a dynamic random access memory (DRAM), and is connected to the min bus 1 via a DRAM controller (DRAMC) 51.

The sub-bus interface (SBUSIF) 13 has a FIFO and several registers and exchanges data with an external bus or sub-bus (SBUS).

Figure 2:
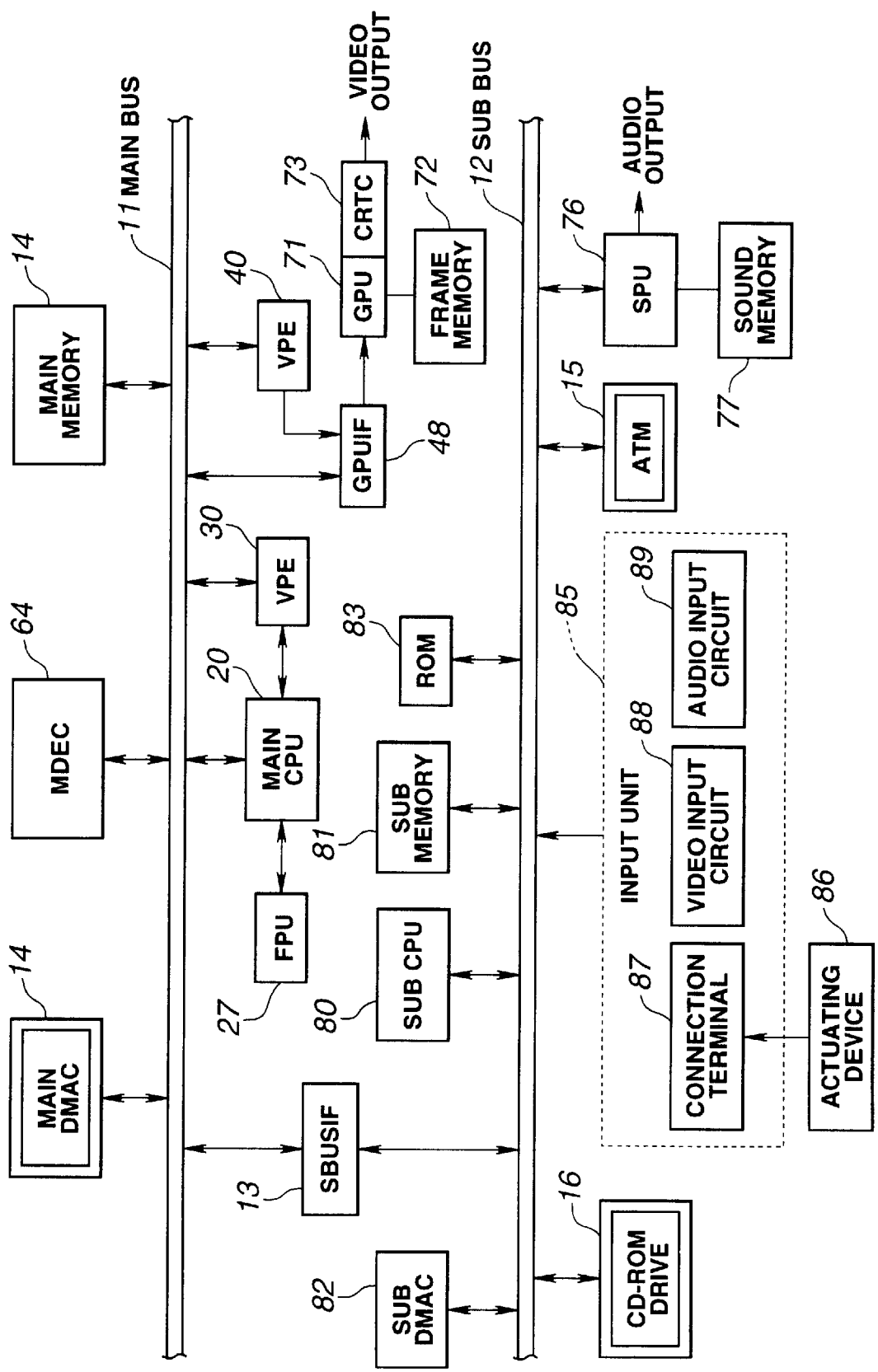
FIG. 2 is a block diagram showing an example of the schematic structure of an entire circuit of a television game machine embodying the present invention.

FIG. 2 shows a schematic structure of the main CPU system of FIG. 1, as applied to an entertainment system, such as a television game machine for household use.

Referring to FIG. 2, the main bus 11 and the sub-bus 12 are interconnected over the SBUSIF 13. The circuit configuration of the vicinity of the main bus 11 is as explained with reference to FIG. 1 and hence corresponding parts are depicted by the same reference numerals and are not explained specifically. To a GPU 71, connected to the GPUIF 48, there is connected a frame memory 72, which is provided with a cathode ray tube controller CRTC 73. Considering that the direct memory access controller (DMAC) is connected to the sub-bus 12, the DMAC 14 connected to the main bus 11 is the main DMAC.

To the sub-bus 12 of FIG. 2 are connected a sub CPU 80, sub-memory DMAC 82, a ROM 83, having a start program or an operating system (OS) stored therein, a sound processing unit (SPU) 15, a communication control unit (ATM) 15, a CD-ROM drive 16, as reproducing means for an external storage medium, and an input unit 85. The input unit 85 includes a connection terminal 87 for connection of an actuating unit 86, a video input circuit 88 for receiving picture data from other devices, not shown, and an audio input circuit 89 for receiving speech data from other devices, not shown.

In the game machine, as shown in FIG. 2, the main CPU 20 reads the start program via SBUSIF 13 from the ROM 83 connected to the sub-bus 12, and executes the start program to actuate the OS.

The main CPU 20 also controls the CD-ROM drive 16 to read out an application program and data from the CD-ROM or the like set on the CD-ROM drive 16 to read out the application program or data to store the read-out data in the main memory 50.

Also, the main CPU 20 generates data for non-routine processing (polygon definition information and so forth), in cooperation with the first vector processor (VPE) 30, for data of a three-dimensional object constituted by plural basic figures (polygons) read out from the CD-ROM, that is coordinate values of apex points (representative points) of polygons. This VPE 30 includes processing elements VU, such as the FMAC 32 or the FDIV 33, calculating a real number part of the floating decimal number, and performs floating decimal point calculations in parallel.

Specifically, the main CPU 20 and the first VPE 30 perform processing in need of delicate operations at valleys of the polygon in geometry processing, such as the state of leaves fluttering in the wind or raindrops on a front window of a car, and sends the calculated polygon defining information, such as calculated apex information or the shading mode information, as packets to the main memory 50 over the main bus 11.

The polygon defining information is made up of the picture drawing area information and the polygon information. The picture drawing area information is made up of the offset coordinates in the frame buffer address of the picture drawing area and the coordinate of the picture clipping area for cancelling the drawing if there is the polygon coordinate outside of the picture drawing area. The polygon information is made up of the polygon attribute information and the apex point information. The polygon attribute information is the information specifying the shading mode, α-blending mode or the texture mapping mode. The apex information includes, for example, the coordinates in the apex picture drawing area, coordinates in apex point texture area and apex point color.

Similarly to the first VPE 30, the second VPE 40 performs floating decimal point calculations, and is used for generating data for processing for generating a picture by actuation of the actuating unit 86 and matrix operations, specifically the data for simpler processing for which programming can be done on the VPE 40, such as polygon defining information. For example, the second VPE 40 performs processing such as perspective transformation for an object of a simpler shape, such as a building or a car, calculations for a collimated light beam or generation of a two-dimensional curved plane. The generated polygon defining information is sent via GPUIF 48 to the GPU 71.

The GPUIF 48 sends the polygon defining information supplied thereto from the main memory 50 over the main bus 11 and the polygon defining information supplied thereto from the second VPE 40 to the GPU 71 as it arbitrates the two so as to avoid possible conflicts.

The GPU 71 draws a picture on the frame memory 72 based on the polygon defining information supplied thereto via GPUIF 48. The GPU 71 can use the frame memory 72 as a texture memory and can bond pixel image on the frame memory 72 as a texture on the polygon being drawn.

The main DMAC 46, which can perform control, such as DMA transfer, on the circuits connected to the main bus 11. In addition, the main DMAC 46 is responsive to the status of the SBUSIF 13 to perform control such as DMA transfer for the circuits connected to the sub-bus 12.

The sub GPU 80 performs various operations in accordance with the program stored in the ROM 83 and performs control operations, such as DMA transfer, on the circuits connected to the sub-bus 12 only if the SBUSIF 13 disconnects the main bus 11 from the sub-bus 12.

The sound processing unit (SPU) 76 is responsive to a sound command supplied thereto from the sub CPU 80 or DMAC 82 to read out speech data from the sound memory 77 to output the speech data as an audio output.

The communication control unit (ATM) 15 is connected to, for example, a public network, and exchanges data over the network.

Figure 3:
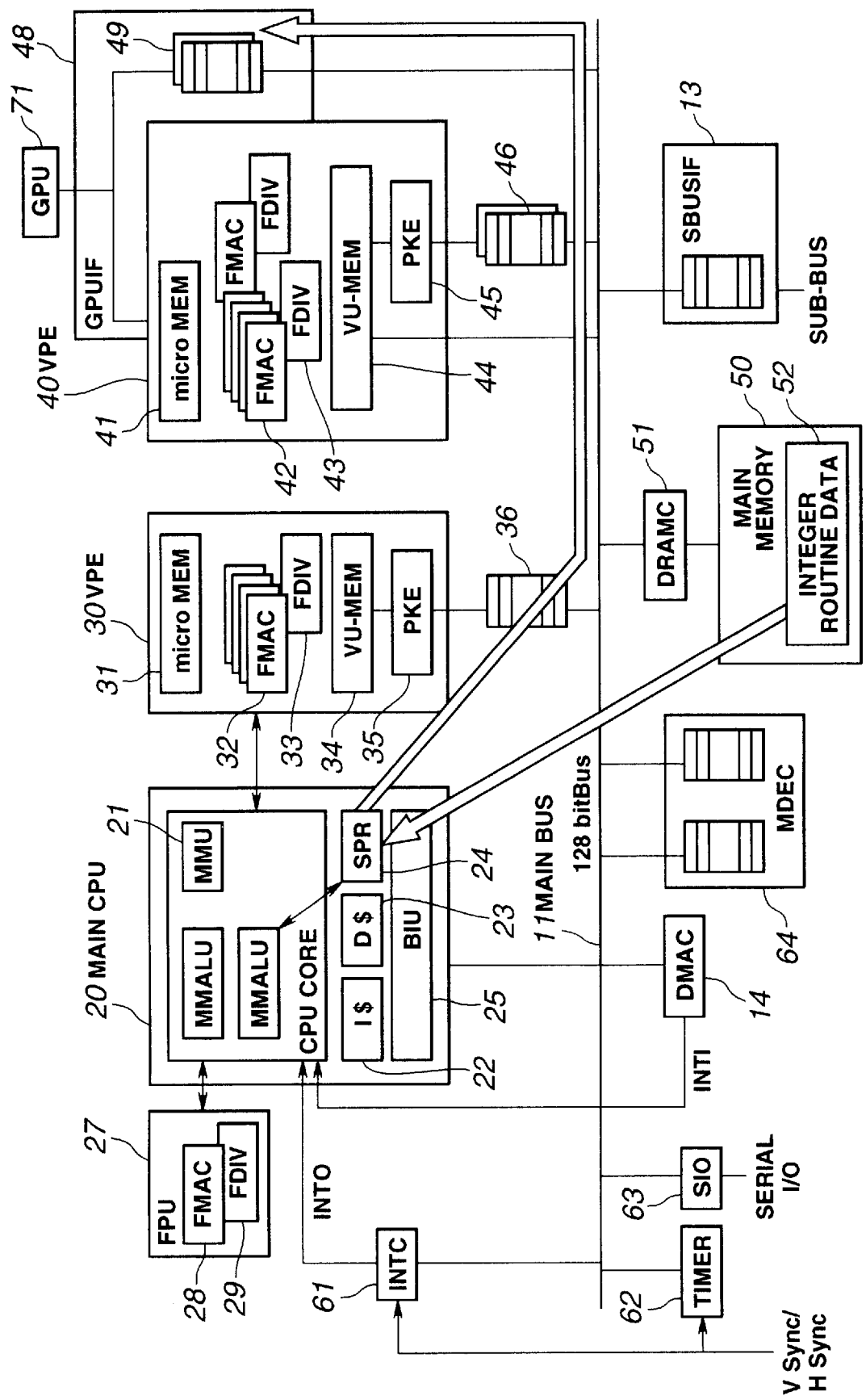
FIG. 3 is a block diagram showing an example of the integer routine processing operation in an embodiment of the present invention.

Referring to FIG. 3 ff., the routine processing operations in the present embodiment are explained.

FIG. 3 shows a data bus for integer processing of integer routine data.

In this figure, integer routine data 52 is transferred by direct memory accessing (DMA) of the DMAC 14 to the scratch pad memory (SPR) 24 in the main CPU 20. The transferred data is subjected to both routine processing and non-routine processing, using a single instruction stream multiple data stream (SIMD) command of the parallel calculation mechanism of the CPU core 21, with the SPR 24 as the working area. The processed data is again transferred by DMA to dedicated devices, such as main memory 50 or GPU 71. By lengthening the burst lead length in this case, the high-speed transfer becomes possible, thus enabling processing at a higher speed than is possible with the usual cache mechanism.

Figure 4:
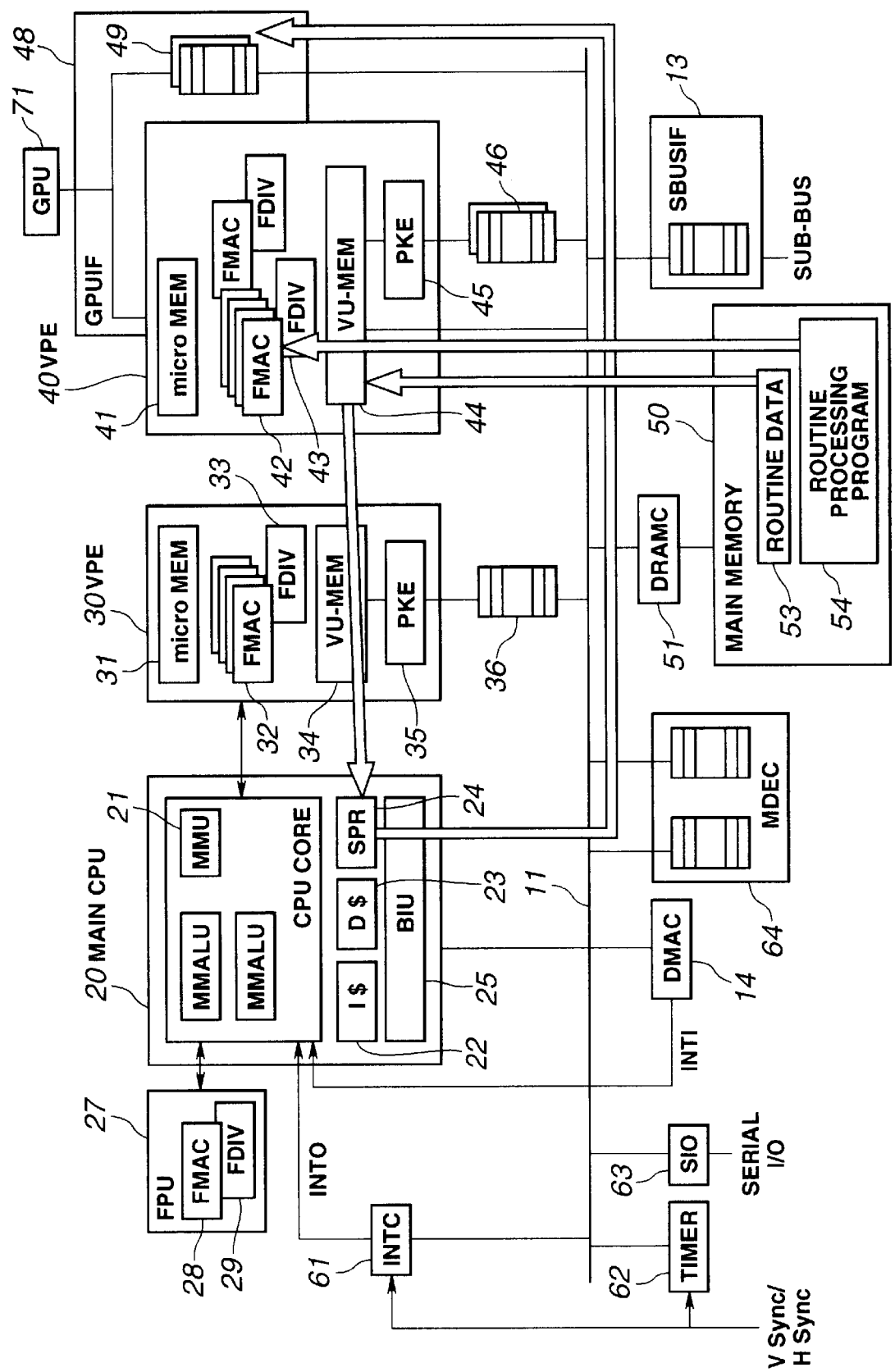
FIG. 4 is a block diagram showing an example of a routine processing operation of routine data in an embodiment of the present invention.
Figure 5:
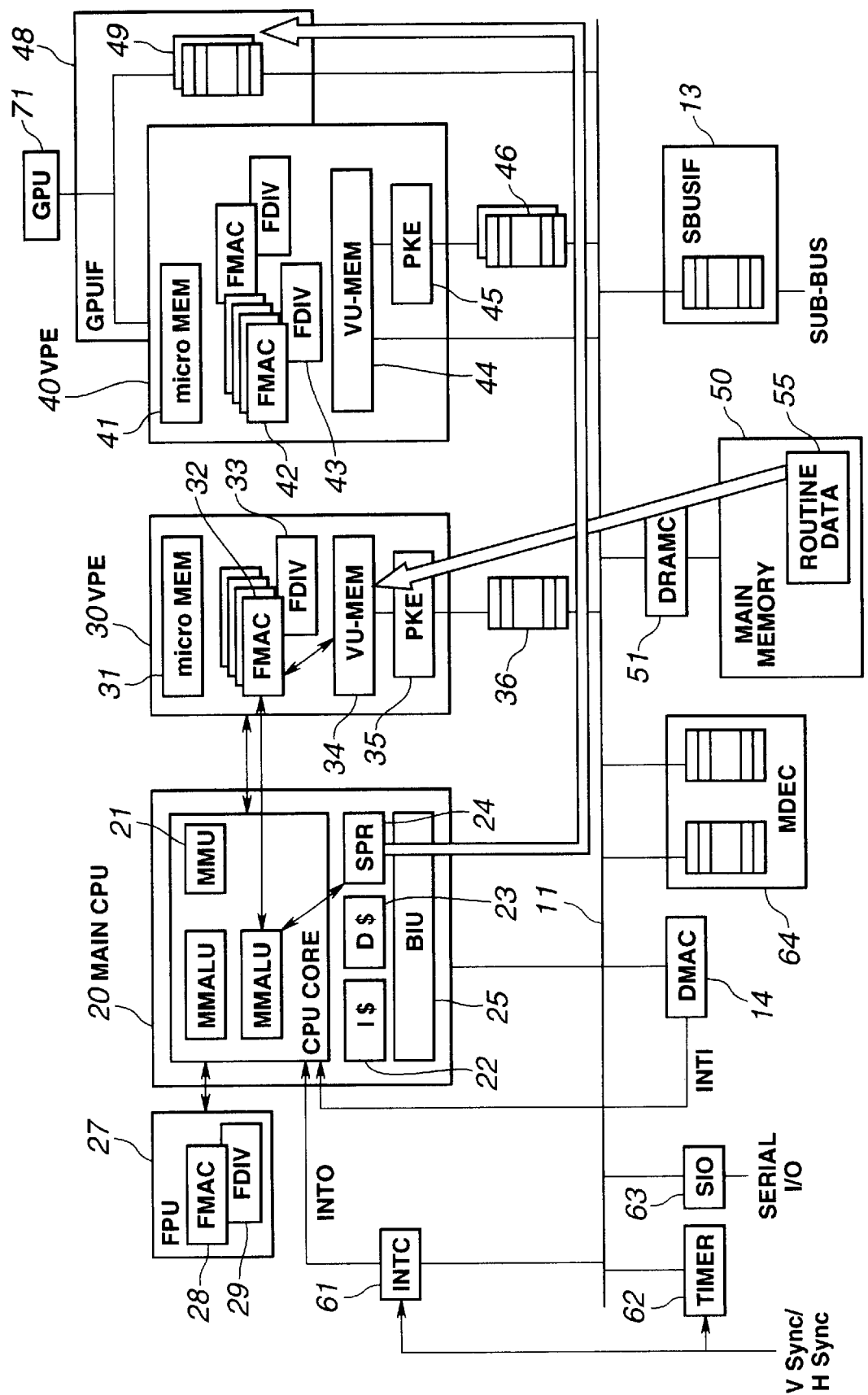
FIG. 5 is a block diagram showing an example of a routine processing operation of non-routine data in an embodiment of the present invention.

FIGS. 4 and 5 show a floating decimal point processing data pass of integers and floating decimal point data. The routine data is first classified into routine precessing and non-routine processing and is set for a routine DMA channel or a non-routine DMA processing.

In the DMA channel for routine processing of routine data, shown in FIG. 4, routine data 53 in the main memory 50 is burst-transferred and expanded by the DMAC 14 to the high-speed internal memory (VU-MEM) 44 in the floating decimal point vector processor (VPE) 40 via packet engine (PKE) 45 as a data expanding mechanism. The routine processing program 54 on the main memory 50 is also transferred to the micro-memory (microMEM) 41 for expansion. The data transferred to and expanded on the VU-MEM 44 is routine-processed on the VU-MEM 44 using the floating decimal point vector command of the VPE 40. As for the micro-program, a resident program on the micro-memory (microMEM) 41 or a non-resident program burst-transferred from the main memory 50 to the micro-memory (microMEM) 41 in association with the data by the DMA is started by a program start command (Program Start) of a tag command in the transferred data. The data portion not processed by routine processing is transferred using a DMA channel connecting to the scratch pad memory (SPR) 24 in the main CPU 20 from the memory (VU-MEM) 44 for routine processing on the SPR 24 in cooperation with the main CPU 20 and the processors 27, 30.

On the DMA channel for routine processing of routine data, shown in FIG. 5, routine data 55 in the main memory 50 is burst-transferred to the internal high-speed memory (VU-MEM) 34 by a packet engine (PKE) 35 as a data expansion mechanism for expansion. The data transferred and expanded by the memory (VU-MEM) 34 is non-routine-processed on the memory (VU-MEM) 44 in accordance with the micro-program of the microMEM 31 started by the main CPU 20 or with the coprocessor command using the floating decimal point vector command of the VPE 30. In the present embodiment, processed data is packed on the main CPU 20 and DMA-transferred via SPR 24 to the GPU 71 or to the main memory 50.

Figure 6:
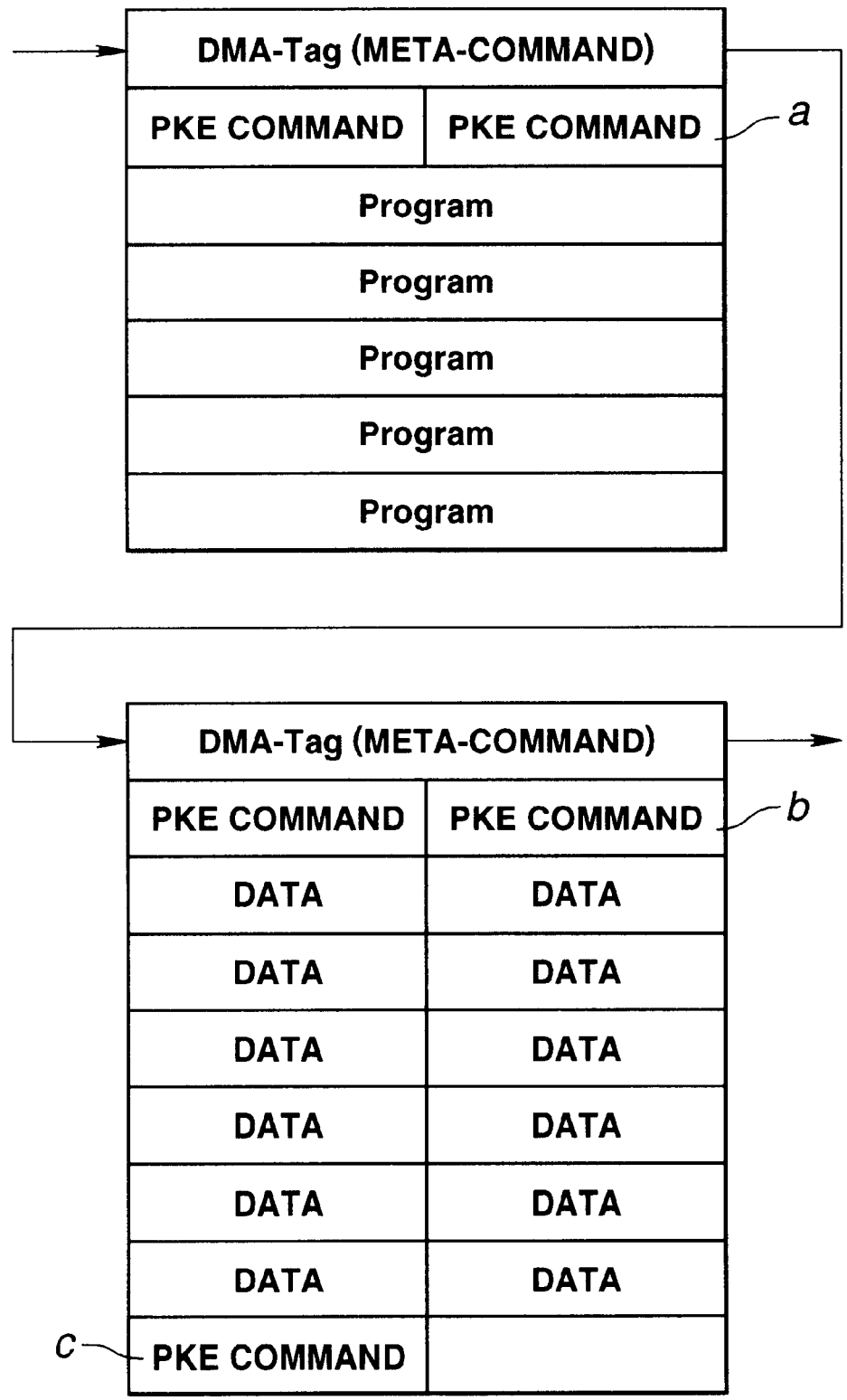
FIG. 6 shows an example of a DMA packet in an embodiment of the present invention.

FIG. 6 shows an example of a DMA packet of the program and data.

Referring to FIG. 6, there is arrayed, in this DMA command, a PKE command for the packet engine PKE as a data expansion mechanism, next to the tag-command (DMA-tag) to the DMAC 14, and is followed by a main portion of the program or data. The PKE command is a command for data transfer or expansion to the PKE or a program transfer or start command. In the example shown in FIG. 6, a PKE command a is a program expansion command, a PKE command b is a data expansion command and a PKE command c is a program start command.

The DMA started by the main CPU 20 transfers packets, linked in accordance with the meta-command in the packet, to the PKE in the VPE in succession. The PKE performs, in accordance with the PKE command in the packet, data expansion in the packet to the internal high-speed memory (VU-MEM) in the VPE, program transfer of the program in the packet to the internal high-speed memory (VU-MEM) and startup of the micro-program of the VPE.

Figure 7:
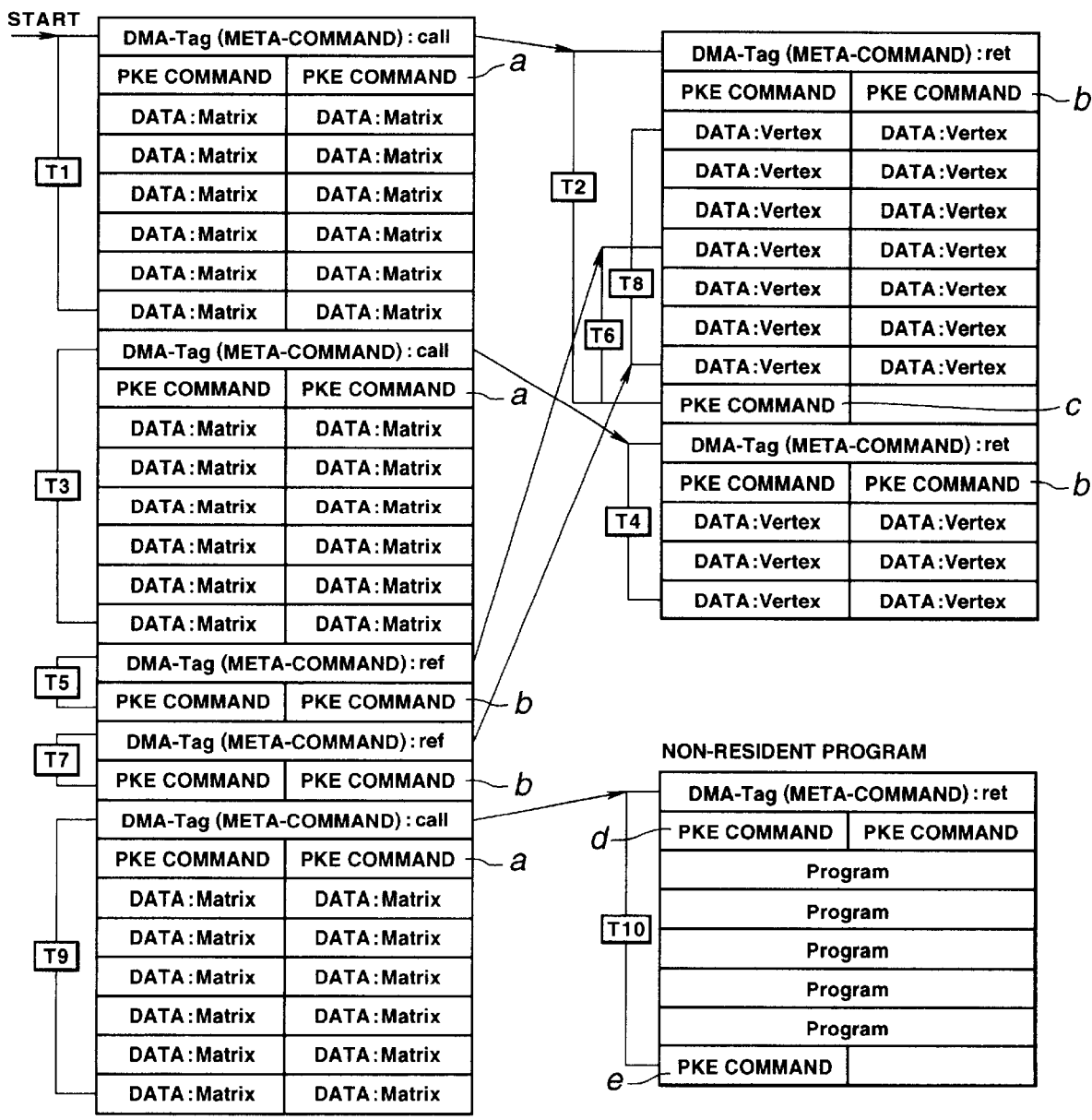
FIG. 7 shows an example of a program of the DMA packet in an embodiment of the present invention.

FIG. 7 shows an example of programming of the VPE 40 employing the DMA packet. In FIG. 7, the codes T1, T2, . . . denote the transfer sequence of the DMA packets. In this sequence, DMA is transferred to the micro-memory (microMEM) 41 or to the memory (VU-MEM) 44. Of these PKE commands, the PKE commands a to e are a data expansion command for setting the matrix (Matrix), a data expansion command for setting the apex point (Vertex) of a polygon, a start command (program Command) of a resident program, a program transfer command, and a start command (Program Start) of a non-resident program, respectively. As the meta-commands for the DMC 14 of the DMA-Tag in the DMA packet, there are shown call, ret and ref in the example of FIG. 7. The call command DMA-transfers data following the tag by a pre-set number, then pushes the address next following the packet to the DMA address stack to execute the next meta-command indicated by the specified address. The ret command DMA-transfers data next following the tag by a specified number, then pops an address from the DMA address stack and executes the meta-command indicated by the popped address. The ref command DMA-transfers the data of the address specified by the meta-command by a specified number and then executes the meta-command of the address next following the packet. In the example shown in FIG. 7, the two data next following the meta-command is DMA-transferred before transferring data of the specified address.

In the program of FIG. 7, for example, since the meta-command of DMA-Tag on program starting is call, the tag command ret of T2 is executed and data of T2 (Vertex) is transferred and expanded after the end of transfer and expansion of data of T2 (Matrix). After execution of the resident program by the PKE command c, control proceeds to the tag command of T3 next following T1. In the DMA packet of T10, the program in the packet is transferred by the PKE command d after which the transferred program (non-resident program) starts to be executed by the PKE command e.

Figure 8:
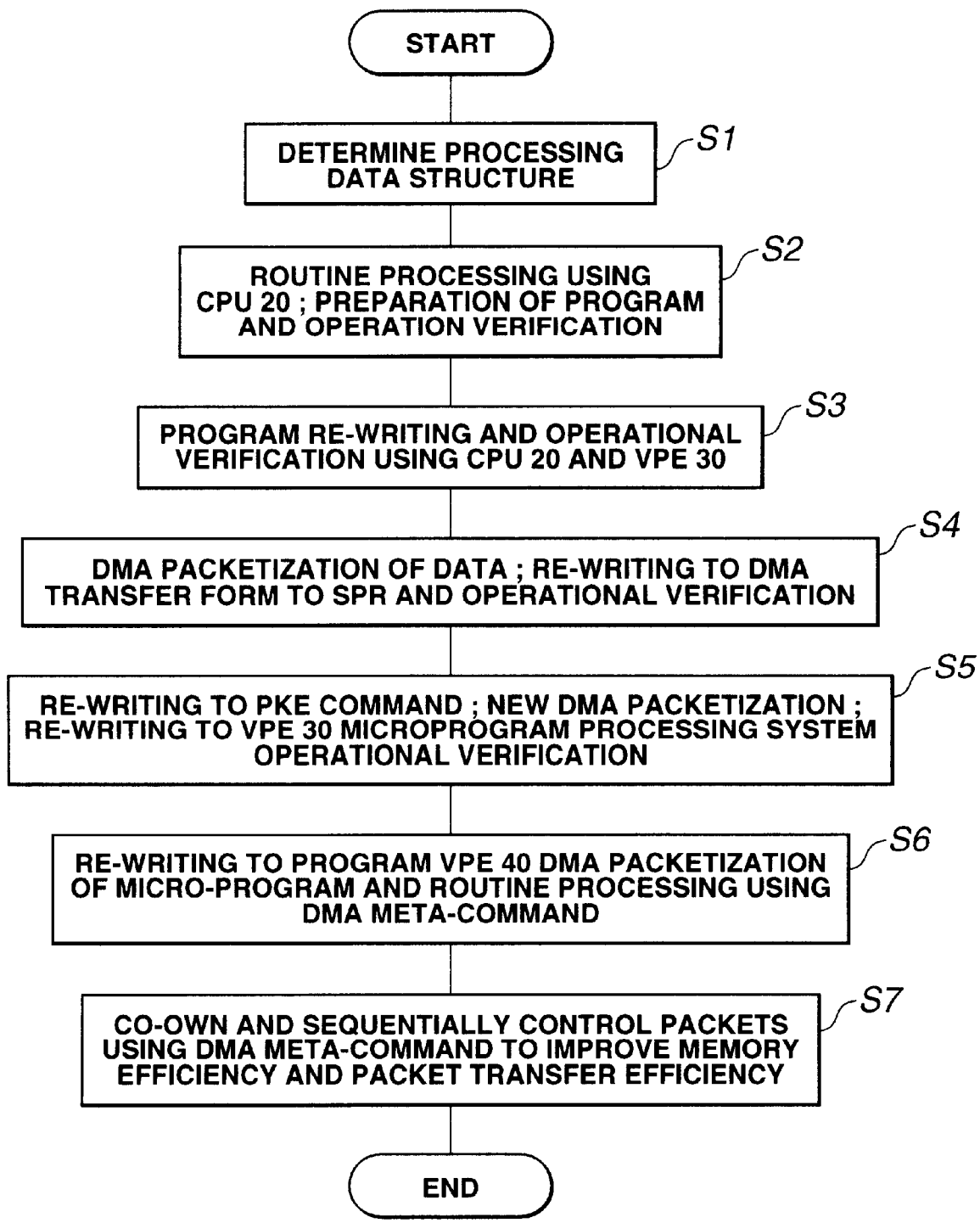
FIG. 8 is a flowchart for illustrating an example of programming of the DMA packet in an embodiment of the present invention.

Referring to FIG. 8, an illustrative programming sequence of a data flow type routine processing program, in which packets enclosing data, programs and program start commands are connected by the meta-command of DMA as shown in FIG. 7, is explained.

At a first step S1 of FIG. 8, a programmer first decides the structure of processing data desired to be routine-processed. At the next step S2, a routine processing program of data, whose structure has been determined at step S1, is formulated, using a usual programming language, such as the C-language employing the CPU 20, and is verified as to its operation, that is in order to verify if the program operated properly. At the next step S3, part of the C-program is corrected, such as by describing it in an assembler language, for re-writing the program to a program employing the CPU 20 and the floating decimal point vector-coprocessor (VPE) 30, in order to verify the program operation. The programmer then proceeds to step S4 to convert the data to a DMA packet for rewriting to a form of DMA-transfer to the internal high-speed memory 24 (SPR) in order to verify the program operation. At the next step S5, the expanded and transferred program from the routine data of the program to the VPE 30 is rewritten to the command of a data expansion mechanism (PKE) to form newly a DMA packet and expanded to the high-speed internal memory VU-MEM in the VPE 30 using the PKE 35 for rewriting to the form of processing by the micro-program of the VPE 30 for operation verification. At the next step S6, the program is rewritten to the processing of the VPE 40 and the micro-program is also converted to the DMA packet which is connected to the data packet by the DMA meta-command to form a data flow type routine processing program. At step S7, co-owning of data packets and the sequence of the processing packets are controlled at step S7 using the DMA meta-command to raise the memory efficiency or to decrease the amount of transfer of data or the non-resident program by way of so-called tuning.

In the above-described embodiment of the present invention, efficient processing for a variety of processing configurations is realized by providing a data bus, a data transfer system, a cache mechanism and a calculation processing device suited to particular processing configurations, such as routine processing for routine data or general non-routine processing.

In particular, a virtual reality modelling language (VRML) or a game, for which it is required to process a large quantity of data and to perform flexible processing, such as 3D-graphics processing, can be processed flexibly efficiently.

For a vector processing device or a calculating processor suited for routine processing, such as SIMD type commands, it is possible to set an amount of burst data transfer more suited than the usual cache mechanism or cache utilization free of wastage by DMA transfer, scratch-pad memory or an enclosed high-speed memory fitted with a data expansion function. There is also provided a data bus for routine data or for non-routine-processed data thus realizing high-speed flexible processing.

The present invention is not limited to the above embodiments. For example, the present invention is applicable to a case wherein only a portion of the configuration of the FPU 27, VPEs 30 and 40 connected to the main CPU 20. The present invention may also be applied to a variety of devices other than the household use television game machines.

What is claimed is:

1. An information processing apparatus comprising:
   a main processor unit at least including parallel computational processing means, cache storage means, and direct-memory-accessible internal high-speed storage means;
   a main storage means;
   a direct memory accessing controlling unit for direct memory access transfer control between said direct-memory-accessible internal high-speed storage means in said main processor unit and said main storage means;
   a main bus to which are connected said main processor unit, said main storage means and the direct memory accessing controlling unit;
   a sub-processing unit;
   a sub-storage means;
   a sub-direct memory accessing controlling unit for performing direct memory accessing control between said sub-processing unit and said sub-storage means;
   a sub-bus to which are connected said sub-processing unit, sub-storage means and said sub-direct memory accessing controlling unit; and
   a sub-bus interface that interconnects said main bus and said sub-bus.

2. The information processing apparatus according to claim 1 for use in an entertainment system, wherein an input unit at least having a connection terminal for connection to an actuating device and reproducing means for an external recording medium are connected to said sub-bus.

3. The information processing apparatus according to claim 1, wherein a floating decimal point vector processing unit at least having vector processing means and direct-memory-accessible high-speed internal storage means is connected to said main bus.

4. An information processing apparatus comprising:
   a main processor unit at least including computational processing means and cache storage means;
   a main storage means;
   a floating decimal point vector processing unit at least including vector processing means and direct-memory-accessible internal high-speed storage means; and
   a main direct memory accessing control unit for direct-memory-access transfer control between said direct-memory-accessible internal high-speed storage means in said floating decimal point vector processing unit and said main storage means;
   a main bus to which are connected said main processor unit, said main storage means and said main direct memory accessing control unit;
   a sub-processing unit;
   a sub-storage means;
   a sub-direct memory accessing control unit for performing direct memory accessing control between said sub-processing unit and said sub-storage means;
   a sub-bus to which are connected said sub-processing unit, said sub-storage means and said sub-direct memory accessing control unit; and
   a sub-bus interface that interconnects said main bus and said sub-bus.

5. The information processing apparatus according to claim 4 for use in an entertainment system, wherein an input unit at least having a connection terminal for connection to an actuating device and reproducing means for an external recording medium are connected to said sub-bus.

6. An information processing apparatus, comprising:
   a main processor unit at least including computational processing means, cache storage means, and a first direct-memory-accessible internal high-speed storage means for storing routine data;
   a main storage means;
   a floating decimal point vector processing unit at least including vector processing means and a second direct-memory-accessible internal high-speed storage means for storing said routine data;
   a direct memory accessing control unit for direct memory-access transfer control of said routine data between said first direct-memory-accessible internal high-speed storage means in said main processor and said main storage means, and between said second direct-memory-accessible internal high-speed storage means in said floating decimal point vector processor unit and said main storage means; and a main bus, wherein said main processor unit, said main storage means and said direct memory accessing control unit are interconnected over said main bus.

* * * * *